US008205945B2

(12) United States Patent
Ma et al.

(10) Patent No.: US 8,205,945 B2
(45) Date of Patent: Jun. 26, 2012

(54) ROTARY MECHANISM OF ROTARY SEATS

(75) Inventors: Jia Ma, Shanghai (CN); Wei Le, Shanghai (CN); Zhi Han, Shanghai (CN); Yi Sun, Shanghai (CN)

(73) Assignee: Lear Corporation, Southfield, MI (US)

( * ) Notice: Subject to any disclaimer, the term of this patent is extended or adjusted under 35 U.S.C. 154(b) by 285 days.

(21) Appl. No.: 12/687,543

(22) Filed: Jan. 14, 2010
(Under 37 CFR 1.47)

(65) Prior Publication Data
US 2011/0012411 A1 Jan. 20, 2011

(30) Foreign Application Priority Data

Jan. 14, 2009 (CN) ...................... 2009 2 0066868 U

(51) Int. Cl.
*A47C 1/00* (2006.01)
*A47B 95/00* (2006.01)
*F16M 13/00* (2006.01)
(52) U.S. Cl. ................. 297/344.26; 248/349.1; 248/425
(58) Field of Classification Search .................. 248/425, 248/349.1; 297/344.22, 344.21, 344.24, 297/344.26
See application file for complete search history.

(56) References Cited

U.S. PATENT DOCUMENTS

| 2,063,674 | A | * | 12/1936 | Hendrickson et al. | ........ 248/395 |
| 3,042,458 | A | * | 7/1962 | Kirk | ................................ 384/18 |
| 3,066,979 | A | * | 12/1962 | Pitts et al. | ...................... 297/240 |
| 5,183,312 | A | * | 2/1993 | Nania | ....................... 297/256.12 |
| 5,474,353 | A | * | 12/1995 | Koester et al. | ............. 296/65.07 |
| 6,113,051 | A | | 9/2000 | Moradell et al. | |
| 7,204,554 | B2 | | 4/2007 | Wieclawski | |

FOREIGN PATENT DOCUMENTS

| DE | 3320989 A1 | 12/1984 |
| DE | 102004013628 A1 | 10/2005 |

OTHER PUBLICATIONS

Office Action dated Sep. 21, 2011 from the German Patent & Trademark Office.

* cited by examiner

*Primary Examiner* — Milton Nelson, Jr.
(74) *Attorney, Agent, or Firm* — Brooks Kushman P.C.

(57) ABSTRACT

A rotary mechanism includes an upper seat pan, a lower seat pan and an arc slideway mechanism. The upper and lower seat pans are connected at their sides and can rotate relative to each other. A middle inner slide rail of the arc slideway mechanism, which has a long through-hole in its center and is fixed to the lower seat pan, is positioned between an upper supporting plate and a lower supporting plate, both of which have a long aperture in their respective centers. Fixed parts run through the long through-hole and the long apertures, and fix an upper outer slide rail and a lower outer slide rail. A locking mechanism having portions fixed to the upper seat pan and the lower seat pan, respectively, is arranged to cooperate with the arc slideway mechanism to limit relative rotation of the upper and lower seat pans.

17 Claims, 3 Drawing Sheets

ROTARY MECHANISM OF ROTARY SEATS

BACKGROUND OF THE INVENTION

1. Field of the Invention

The present invention relates to a rotary mechanism for rotary seats.

2. Background Art

At present, sliding seats in automobiles are adjustable backward and forward via certain sliding mechanisms. Other aspects of seat designs, such as easy entry and easy buckling of child seats, are not present in many designs. One type of swivel seat is described in U.S. Pat. No. 7,204,554, entitled "Swivel Seat", and issued on 17 Apr. 2007.

SUMMARY OF THE INVENTION

Embodiments of the present invention generally include a rotary mechanism for rotary seats, which can achieve easily functions such as easy entry, convenient buckling of safety belts and so on, at the same time is simple and compact, has a relative low cost, and can be suitable for automobiles of different types and prices.

In at least one embodiment, the rotary mechanism of the present invention includes the following structures: an upper seat pan, a lower seat pan, and an arc slideway mechanism. The upper seat pan and the lower seat pan are connected relatively rotatably proximate their respective sides. The arc slideway mechanism is located between the upper seat pan and the lower seat pan, and is connected with the upper seat pan and the lower seat pan respectively for facilitating the relative rotation of the upper seat pan and the lower seat pan.

The arc slideway mechanism may include an upper outer slide rail, an upper supporting plate, a middle inner slide rail, a lower supporting plate, a lower outer slide rail and certain fixed parts. The middle inner slide rail has a long aperture, or through-hole, in its center, while the upper supporting plate and the lower supporting plate may both have long apertures in their respective centers. The middle inner slide rail is positioned between the upper supporting plate and the lower supporting plate. The upper outer slide rail is on the upper supporting plate and the lower outer slide rail is under the lower supporting plate. The fixed parts run through the long through-hole in the middle inner slide rail and the long apertures in the upper and lower supporting plates, and further, run through apertures in the upper and lower outer slide rails to fix the upper outer slide rail and the lower outer slide rail to each other. The upper outer slide rail can be fixed to the upper seat pan or the lower seat pan depending on its orientation upon installation, and the middle inner slide rail is fixed to the other of the lower seat pan and the upper seat pan.

In some embodiments of the present invention, the fixed parts are rivets. Some embodiments include at least one group of rolling devices, such as balls, arranged respectively in the upper supporting plate and the lower supporting plate. The cross sections of the upper outer slide rail and the lower outer slide rail may both be U-shaped arranged face-to-face, while the middle inner slide rail may be an inverted U-shape having at least one open end and being located between the upper supporting plate and the lower supporting plate.

In some embodiments, the two sides along a length of the long through-hole in the middle inner slide rail protrude downwards to insert into the long aperture of the lower supporting plate, or protrude upwards to insert into the long aperture of the upper supporting plate, depending on the orientation upon installation. The arc slideway mechanism may include an upper L-shaped bracket and a lower supporting bracket, where the upper L-shaped bracket is fixed on the upper outer slide rail. In such embodiments, the upper outer slide rail is fixed indirectly to the upper seat pan through the upper L-shaped bracket, and the lower supporting bracket is fixed on the lower surface of the lower outer slide rail.

In some embodiments of the present invention, the upper L-shaped bracket, the upper outer slide rail, the lower outer slide rail and the lower supporting bracket are fixed together with at least one fixed part, which may be a rivet. The rotary mechanism of the present invention may also include a locking mechanism, portions of which are respectively fixed to the upper seat pan and the lower seat pan, and which is arranged to cooperate with the arc slideway mechanism. In some embodiments, the locking mechanism includes a locking handle, a locking component and a locking bar. The locking handle and the locking component may be fixed on the upper seat pan, the locking handle may be connected to the locking component with a cable, and the locking bar may be fixed on the upper seat pan and located in the locking component when the rotary mechanism is latched. The upper seat pan and the lower seat pan may rotate relative to each other around a position proximate their sides—for example, at a rotational connector arrangement. Such a rotational connector arrangement may be connected fixedly with the sides of the upper seat pan and the lower seat pan.

Embodiments of the present invention provide a rotary mechanism for a seat that includes an upper seat pan and a lower seat pan rotatably connected to the upper seat pan. The rotary mechanism further includes an arc slideway mechanism located between and connected to the upper seat pan and the lower seat pan. The arc slideway mechanism provides a generally arcuate track for controlling relative rotational motion of the upper and lower seat pans.

Embodiments of the invention also provide a rotary mechanism for a seat that includes upper and lower seat pans, and a rotational connector arrangement pivotally connecting the upper and lower seat pans to each other. The rotary mechanism further includes an arc slideway mechanism including a portion attached to the upper seat pan, another portion attached to the lower seat pan, and a plurality of rolling devices disposed therebetween to facilitate sliding motion between the two portions. The arc slideway mechanism further includes at least one locking mechanism having latched and unlatched positions for respectively inhibiting and facilitating relative rotational movement between the upper and lower seat pans.

Embodiments of the present invention may provide relative rotation of the upper and lower seat pans by a sliding motion along the arc slideway around the rotational connector arrangement. In addition, with the relative sliding of the inner and outer slide rails, the supporting of the supporting plates, and the assistant guiding role of the rivets, a seat equipped with the present invention may rotate easily, and provide other desirable functionality, such as easy entry, convenient buckling of safety belts and so on.

DETAILED DESCRIPTION OF EMBODIMENTS OF THE INVENTION

In order to understand the technical content of the present invention more clearly, the present invention is exemplified further by reference to the following embodiments.

Figure 1:
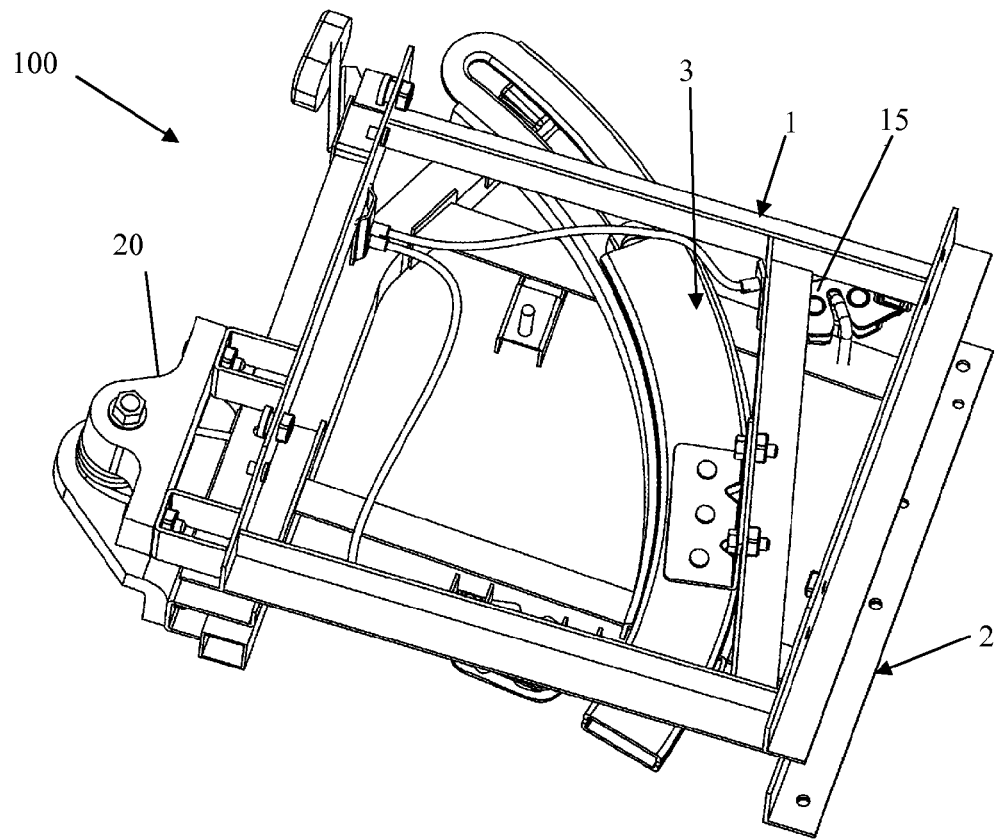
FIG. 1 is a perspective view of one embodiment of the present invention.

FIG. 1 shows a rotary mechanism 100 for rotary seats of the present invention. The rotary mechanism 100 includes an upper seat pan 1 and a lower seat pan 2, and an arc slideway mechanism 3. The upper seat pan 1 and the lower seat pan 2 are connected relatively rotatably proximate their respective sides 22, 24—see FIG. 6. In particular, they are connected at a rotational connector arrangement 20. The arc slideway mechanism 3 is located between the upper seat pan 1 and the lower seat pan 2, and is connected with the upper seat pan 1 and the lower seat pan 2 for facilitating the relative rotation of the upper seat pan 1 and the lower seat pan 2.

Figure 2:
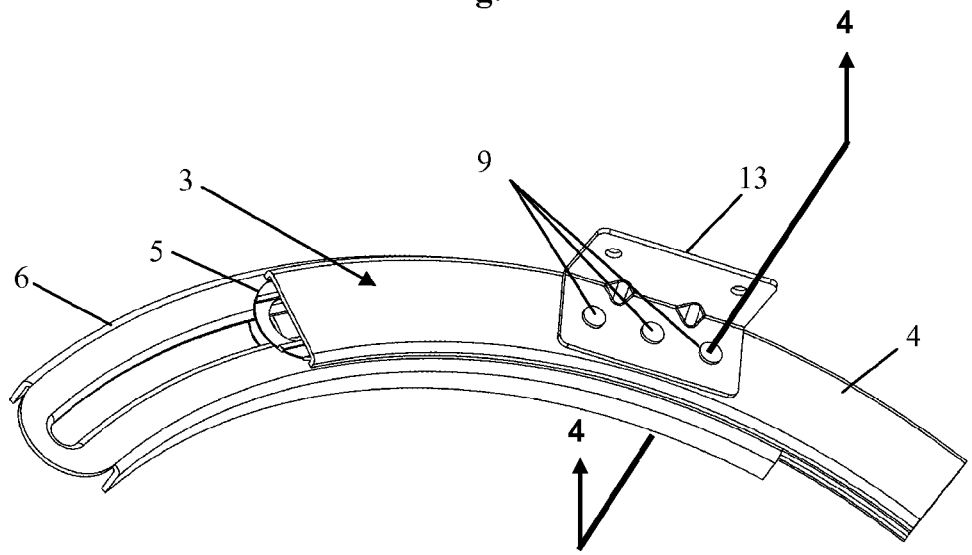
FIG. 2 is a perspective view of the arc slideway mechanism of the embodiment shown in FIG. 1.
Figure 3:
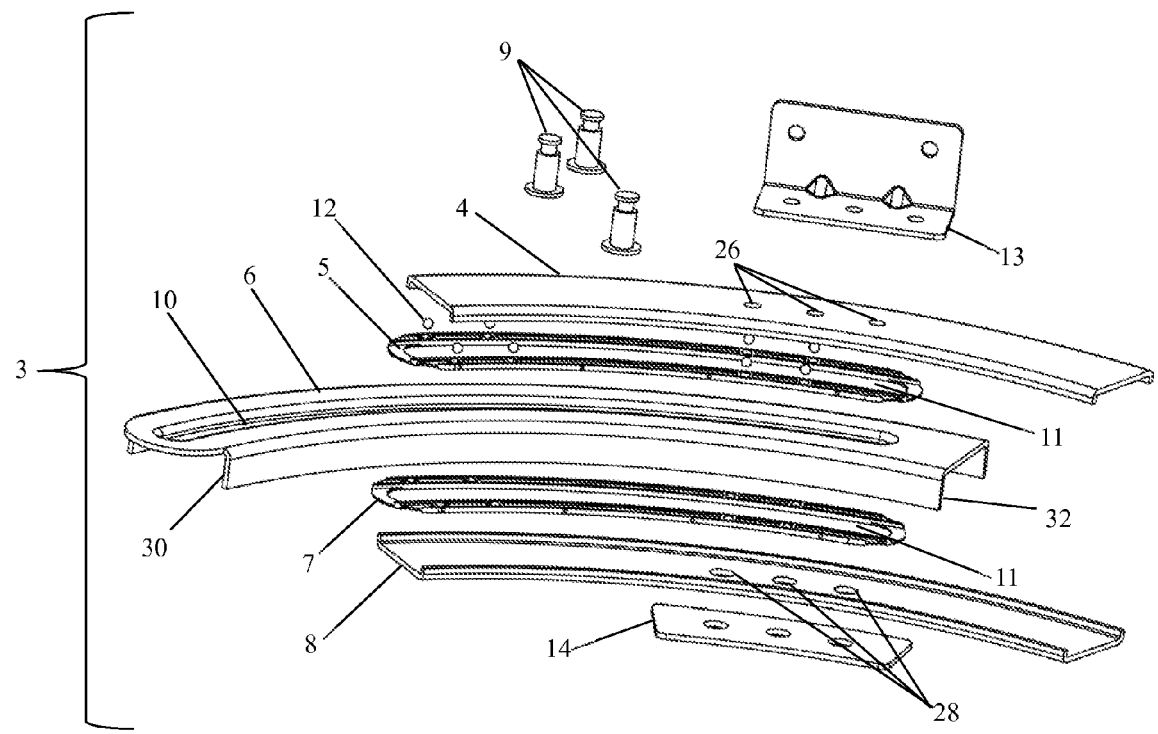
FIG. 3 is an exploded view of the arc slideway mechanism shown in FIG. 2.

As shown in FIGS. 2 and 3, the arc slideway mechanism 3 includes an upper outer slide rail 4, an upper supporting plate 5, a middle inner slide rail 6, a lower supporting plate 7, a lower outer slide rail 8 and fixed parts 9. In the embodiment illustrated in the drawing figures, the fixed parts are rivets 9. The middle inner slide rail 6 has a long aperture, or through-hole, 10 in its center, and the upper supporting plate 5 and the lower supporting plate 7 both have a long aperture 11 in their respective centers. The middle inner slide rail 6 is positioned between the upper supporting plate 5 and the lower supporting plate 7, while the upper outer slide rail 4 is on the upper supporting plate 5, and the lower outer slide rail 8 is under the lower supporting plate 7.

The rivets 9 run through the long through-hole 10 and the long apertures 11, and further, run through apertures 26, 28 respectively disposed in the upper and lower outer slide rails 4, 8 to connect the upper outer slide rail 4 and the lower outer slide rail 8. As explained below and illustrated in FIGS. 5 and 6, the upper outer slide rail 4 is fixed to the upper seat pan 1 by bracket 13, and the middle inner slide rail 6 is fixed to the lower seat pan 2, for example, by welding. The upper supporting plate 5 and the lower supporting plate 7 are located between the middle inner slide rail 6 and the upper outer slide rail 4 and between the middle inner slide rail 6 and the lower outer slide rail 8, respectively, for playing the supporting and sliding roles, and the rivets 9 provide strength and enhance the orientation of the relative sliding of the slideway mechanism 3.

At least one group of rolling balls 12 is arranged respectively in the upper supporting plate 5 and the lower supporting plate 7. In the embodiment of the present invention shown in FIG. 3, eight rolling balls 12 are arranged respectively in the upper supporting plate, or carrier, 5 and the lower supporting plate, or carrier, 7. The rolling balls 12 may be steel to provide strength and facilitate rotation of the rotary mechanism 100.

Figure 4:
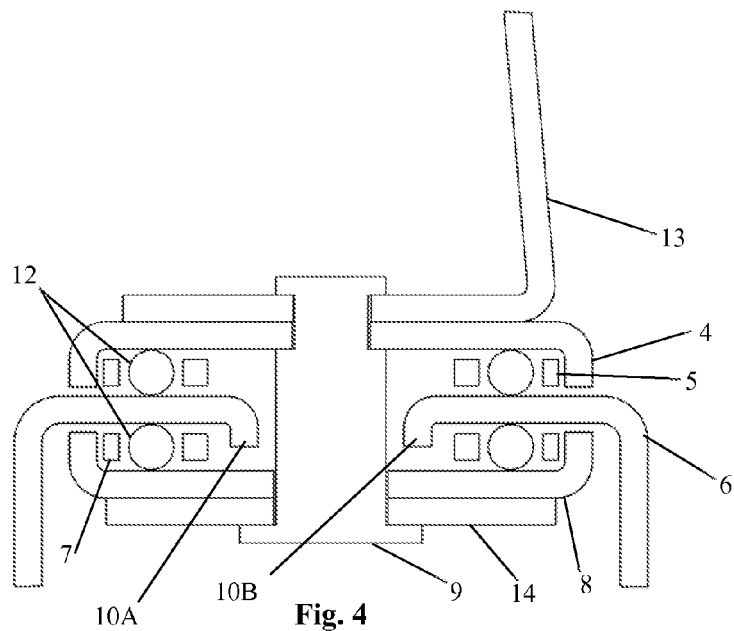
FIG. 4 is a cross-sectional view of the arc slideway mechanism shown in FIG. 2, taken through line 4-4.

In the embodiment shown in the drawing figures, the cross sections of the upper outer slide rail 4 and the lower outer slide rail 8 both are U-shaped, and are arranged face-to-face, and the middle inner slide rail 6 is an inverted U-shape located between the upper supporting plate 5 and the lower supporting plate 7. The middle inner slide rail 6 has two sides 10A and 10B—see FIG. 4—along a length of the long through-hole 10 which protrude downwards to insert into the long aperture 11 of the lower supporting plate 7, or protrude upwards to insert into the long aperture 11 of the upper supporting plate 5 if the orientation of the middle inner slide rail 6 is reversed. That is to say, the two sides 10A, 10B along a length of the long through-hole 10 act as flanges to increase the strength of the slideway and enhance the orientation. The middle inner slide rail has open ends 30, 32 to facilitate the rotational sliding movement of its elements.

The arc slideway mechanism 3 further includes an upper L-shaped bracket 13 and a lower supporting bracket 14. The upper L-shaped bracket 13 is fixed on the upper outer slide rail 4; thus, the upper outer slide rail 4 is fixed indirectly to the upper seat pan 1 through the upper L-shaped bracket 13. The lower supporting bracket 14 is fixed on the lower surface of the lower outer slide rail 8.

In the embodiment of the present invention shown in the drawing figures, the upper L-shaped bracket 13, the upper outer slide rail 4, the lower outer slide rail 8 and the lower supporting bracket 14 are fixed together with the rivets 9. The rotary mechanism 100 also includes a locking mechanism 15—see FIG. 1, a portion of which is fixed to the upper seat pan 1, and another portion of which is fixed to the lower seat pan 2. The locking mechanism 15 is arranged to cooperate with the arc slideway mechanism 3 to stop the rotation of the upper seat pan 1 relative to the lower seat pan 2.

The locking mechanism 15 includes a locking handle 16, a locking component 17 and a locking bar 18. The locking handle 16 and the locking component 17 are fixed on the upper seat pan 1. The locking handle 16 is connected to the locking component 17 with a cable 19. The locking bar 18 is fixed on the lower seat pan 2 and cooperates with the locking component 17. In the embodiment of the present invention shown in the drawing figures, the locking mechanism 15 includes two locking components 17, 17' and two locking bars 18, 18'. The locking handle 16 is connected to the two locking components 17, 17' with two cables 19, 19', respectively. The locking component 17 and the locking bar 18 form one group, and are in a latched position when the seat pans 1, 2 are in the initial, un-rotated position—see FIG. 5. The locking component 17' and the locking bar 18' form another group, and are in a latched position when the seat pans 1, 2 are in the position after being rotated—see FIG. 6. In the rotated position, the locking component 17 and the locking bar 18 are in an unlatched position.

Figure 5:
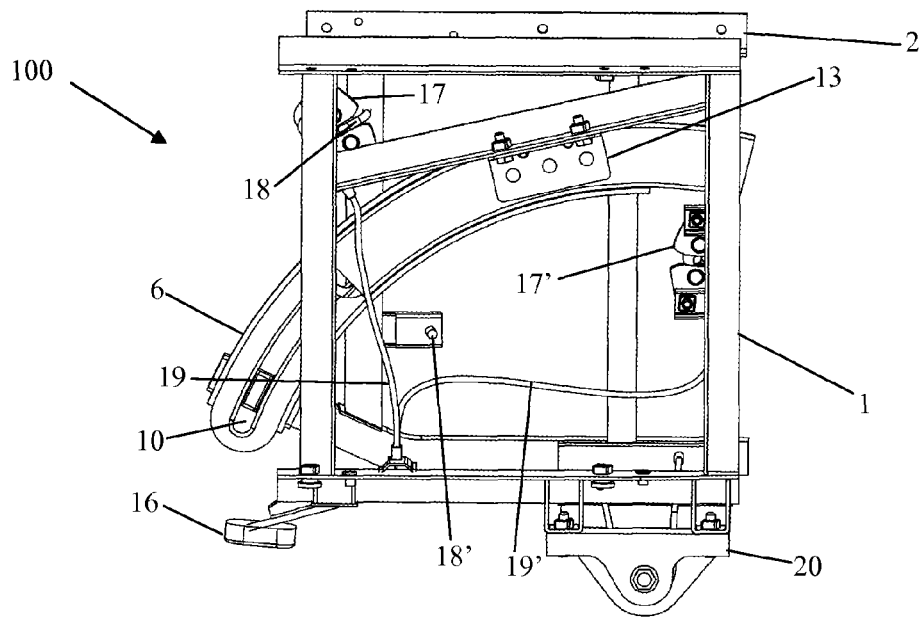
FIG. 5 is a top view of the embodiment shown in FIG. 1 un-rotated.

As described above, the rotary mechanism 100 includes a rotational connector arrangement 20 connected fixedly to the side 22 of the upper seat pan 1 and the side 24 of the lower seat pan 2. As shown in FIG. 5, the rotary mechanism 100 is in its initial, un-rotated position, and in FIG. 6, the rotary mechanism 100 is shown in its rotated position, which is approximately 50 degrees from the initial, un-rotated position. When the present invention is installed, the upper seat pan 1 may be fixed to a seat cushion, and the lower seat pan 2 may be fixed to the lower fixed end below the seat.

Figure 6:
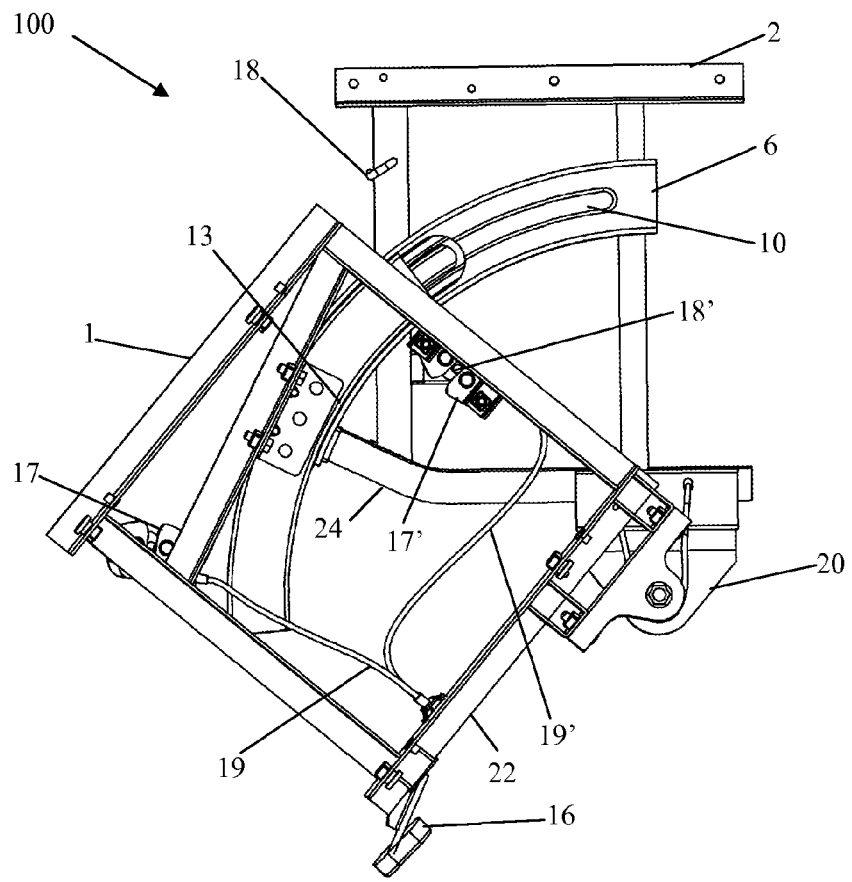
FIG. 6 is a top view of the embodiment shown in FIG. 1 rotated.

As shown in FIG. 5, the rotary mechanism 100 is at the initial position, and the locking mechanism 15 is in a latched position. The rotary mechanism 100 is locked by locking component 17 and locking bar 18. If the locking handle 16 is actuated, for example, by turning it to a certain angle, the cable 19 will open the locking component 17, then the upper seat pan 1 can rotate along the arc slideway mechanism 3 about 50 degrees to be stopped by the locking bar 18' locked in the locking component 17'. Then the seat is at the position after rotated, as shown in FIG. 6, to facilitate the entry and the buckling of the safety belt.

While the present invention has been particularly shown and described with references to preferred embodiments thereof, it will be understood by those skilled in the art that various changes in form and details may be made therein without departing from the spirit and scope of the invention as defined by the claims. It is clearly understood therefore that the same is by way of illustration and example only and is not to be taken by way of limitation.

What is claimed is:

1. A rotary mechanism for a seat, comprising:
an upper seat pan;
a lower seat pan connected relatively rotatably to the upper seat pan proximate the respective sides of the upper and lower seat pans; and
an arc slideway mechanism located between and connected to the upper seat pan and the lower seat pan for guiding the relative rotation of the upper seat pan and the lower seat pan the arc slideway mechanism comprising an upper outer slide rail, an upper supporting plate, a middle inner slide rail, a lower supporting plate, a lower outer slide rail and at least one fixed part, the middle inner slide rail including a long through-hole in a center portion, the upper supporting plate and the lower supporting plate each having a long aperture in a respective center portion, the middle inner slide rail being positioned between the upper supporting plate and the lower supporting plate, the upper outer slide rail being on the upper supporting plate, the lower outer slide rail being under the lower supporting plate, the at least one fixed part running through the long through-hole and the long apertures to fix the upper outer slide rail and the lower outer slide rail, the upper outer slide rail being fixed to one of the upper seat pan or the lower seat pan, and the middle inner slide rail being fixed to an other of the lower seat pan or the upper seat pan.

2. The rotary mechanism of claim 1, further comprising a rotational connector arrangement connected fixedly with the respective sides of the upper seat pan and the lower seat pan.

3. The rotary mechanism of claim 1, wherein at least one group of rolling balls is arranged respectively in each of the upper supporting plate and the lower supporting plate.

4. The rotary mechanism of claim 1, wherein the cross sections of the upper outer slide rail and the lower outer slide rail both are generally U-shaped and are arranged face-to-face, the middle inner slide rail being generally U-shaped and located between the upper supporting plate and the lower supporting plate.

5. The rotary mechanism of claim 1, wherein the length of the long through-hole includes two sides along its length protruding to insert into the long aperture in one of the lower supporting plate or the upper supporting plate.

6. The rotary mechanism of claim 1, wherein the arc slideway mechanism further comprises an upper generally L-shaped bracket and a lower supporting bracket, the upper generally L-shaped bracket being fixed on the upper outer slide rail to indirectly fix the upper outer slide rail to the upper seat pan, the lower supporting bracket being fixed on the lower surface of the lower outer slide rail.

7. The rotary mechanism of claim 6, wherein the upper generally L-shaped bracket, the upper outer slide rail, the lower outer slide rail and the lower supporting bracket are fixed together with the at least one fixed part.

8. The rotary mechanism of claim 1, further comprising a locking mechanism having a portion fixed to the upper seat pan and another portion fixed to the lower seat pan, the locking mechanism being arranged to cooperate with the arc slideway mechanism to inhibit relative rotation of the upper seat pan and the lower seat pan.

9. The rotary mechanism of claim 8, wherein the locking mechanism comprises a locking handle, a locking component and a locking bar, the locking handle and the locking component being fixed on the upper seat pan and connected to each other with a cable, the locking bar being fixed on the upper seat pan.

10. A rotary mechanism for a seat, comprising:
an upper seat pan;
a lower seat pan connected relatively rotatably to the upper seat pan proximate the respective sides of the upper and lower seat pans;
an arc slideway mechanism located between and connected to the upper seat pan and the lower seat pan for guiding the relative rotation of the upper seat pan and the lower seat pan; and
a locking mechanism having a portion fixed to the upper seat pan and another portion fixed to the lower seat pan, the locking mechanism being arranged to cooperate with the arc slideway mechanism to inhibit relative rotation of the upper seat pan and the lower seat pan, the locking mechanism comprising a locking handle, a locking component and a locking bar, the locking handle and the locking component being fixed on the upper seat pan and connected to each other with a cable, the locking bar being fixed on the upper seat pan.

11. A rotary mechanism for a seat, comprising:
an upper seat pan;
a lower seat pan rotatably connected to the upper seat pan; and
an arc slideway mechanism located between and connected to the upper seat pan and the lower seat pan, the arc slideway mechanism providing a generally arcuate track for controlling relative rotational motion of the upper and lower seat pans, wherein the arc slideway mechanism comprises: an upper outer slide rail attached to the upper seat pan, a lower outer slide rail, at least one rolling device disposed therebetween for facilitating relative sliding movement between the upper and lower outer slide rails, a middle inner slide rail, a plurality of the rolling devices disposed between the upper outer slide rail and the middle inner slide rail, and a plurality of the rolling devices disposed between the lower outer slide rail and the middle inner slide rail.

12. The rotary mechanism of claim 11, wherein the arc slideway mechanism further comprises an upper carrier disposed between the upper outer slide rail and the middle inner slide rail, and a lower carrier disposed between the lower outer slide rail and the middle inner slide rail, each of the carriers being configured to carry the rolling devices such that they remain between the middle inner slide rail and their respective outer slide rail.

13. The rotary mechanism of claim 12, wherein the upper and lower carriers and the middle inner slide rail each have an elongate aperture therethrough, and the upper and lower outer slide rails each have at least one aperture therethrough, the arc slideway mechanism further comprising at least one fixed part extending through each of the elongate apertures and through a respective one of the at least one aperture in each of the upper and lower outer slide rails.

14. The rotary mechanism of claim 12, wherein the elongate aperture in the middle inner slide rail includes two sides extending for at least a portion of the length of the elongate aperture, each of the two sides protruding into the elongate aperture of one of the upper or lower carrier when the arc slideway mechanism is assembled with the at least one fixed part.

15. The rotary mechanism of claim 14, further comprising a locking mechanism having latched and unlatched positions, and having a portion attached to the upper seat pan and another portion attached to the lower seat pan, the locking mechanism being configured to stop rotation of the upper seat pan relative to the lower seat pan when the locking mechanism is in the latched position.

16. The rotary mechanism of claim 15, wherein the locking mechanism includes a locking handle, a locking component and a locking bar, the locking handle and locking component each being attached to one of the upper or lower seat pans, and the locking bar being attached to the other of the upper or lower seat pans, the locking component being configured to engage the locking bar when the locking mechanism is in the latched position, and further being configured to release the locking bar when the locking mechanism is changed from the latched position to the unlatched position.

17. The rotary mechanism of claim 16, wherein the locking mechanism further comprises a cable operatively connected between the locking handle and the locking component, such that actuating the locking handle tensions the cable and releases the locking bar when the locking mechanism is changed from the latched position to the unlatched position.

* * * * *

UNITED STATES PATENT AND TRADEMARK OFFICE
CERTIFICATE OF CORRECTION

PATENT NO.       : 8,205,945 B2
APPLICATION NO.  : 12/687543
DATED            : June 26, 2012
INVENTOR(S)      : Jia Ma et al.

It is certified that error appears in the above-identified patent and that said Letters Patent is hereby corrected as shown below:

Column 6, Line 57, Claim 14:

Delete "wherein the elongate aperture"

and insert -- wherein an elongate aperture --.

Signed and Sealed this
Eighteenth Day of September, 2012

David J. Kappos
*Director of the United States Patent and Trademark Office*